US009256798B2

(12) United States Patent
Walker et al.

(10) Patent No.: US 9,256,798 B2
(45) Date of Patent: Feb. 9, 2016

(54) DOCUMENT ALTERATION BASED ON NATIVE TEXT ANALYSIS AND OCR

(71) Applicant: Longsand Limited, Cambridge (GB)

(72) Inventors: James Richard Walker, Durham, NC (US); James Arthur Burtoft, Bellefonte, PA (US)

(73) Assignee: Aurasma Limited, Cambridge (GB)

( * ) Notice: Subject to any disclaimer, the term of this patent is extended or adjusted under 35 U.S.C. 154(b) by 280 days.

(21) Appl. No.: 13/756,432

(22) Filed: Jan. 31, 2013

(65) Prior Publication Data

US 2014/0212040 A1   Jul. 31, 2014

(51) Int. Cl.
G06K 9/18    (2006.01)
G06K 9/34    (2006.01)
G06K 9/20    (2006.01)

(52) U.S. Cl.
CPC .............. *G06K 9/342* (2013.01); *G06K 9/2081* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,568,248 A * | 10/1996 | Wagley | | 399/156 |
| 5,689,620 A * | 11/1997 | Kopec | G06K 9/6256 | 382/157 |
| 5,862,256 A * | 1/1999 | Zetts | G06K 9/00416 | 382/187 |
| 6,507,845 B1 * | 1/2003 | Cohen et al. | | 707/608 |
| 7,106,905 B2 * | 9/2006 | Simske | | 382/229 |
| 7,738,706 B2 * | 6/2010 | Aradhye | G06K 9/3283 | 382/105 |
| 7,783,644 B1 * | 8/2010 | Petrou | G06F 17/30657 | 707/748 |
| 8,755,595 B1 * | 6/2014 | Bissacco et al. | | 382/159 |
| 8,761,513 B1 * | 6/2014 | Rogowski | G06F 17/2854 | 382/135 |
| 8,965,129 B2 * | 2/2015 | Rogowski | G06F 17/289 | 382/181 |
| 2001/0056352 A1 * | 12/2001 | Xun | | 704/277 |
| 2003/0033288 A1 * | 2/2003 | Shanahan | G06F 17/3064 | |
| 2004/0130744 A1 * | 7/2004 | Wu | H04N 1/00278 | 358/1.15 |
| 2005/0071746 A1 * | 3/2005 | Hart et al. | | 715/500.1 |
| 2006/0257005 A1 * | 11/2006 | Bergeron et al. | | 382/103 |
| 2007/0041642 A1 * | 2/2007 | Romanoff et al. | | 382/177 |
| 2007/0253620 A1 * | 11/2007 | Nagarajan et al. | | 382/164 |
| 2008/0219513 A1 * | 9/2008 | Hasegawa | | 382/112 |
| 2008/0229180 A1 * | 9/2008 | Bhatt et al. | | 715/202 |
| 2008/0233980 A1 * | 9/2008 | Englund et al. | | 455/466 |
| 2009/0164881 A1 * | 6/2009 | Segarra et al. | | 715/230 |
| 2009/0222799 A1 * | 9/2009 | Stewart et al. | | 717/143 |
| 2010/0082349 A1 * | 4/2010 | Bellegarda et al. | | 704/260 |

(Continued)

OTHER PUBLICATIONS

Automated Redaction Tool with OCR, CVISION Technologies, Inc., Retreived on Jan. 29, 2013,http://www.cvisiontech.com/document-automation/data-entry/automated-redaction-tool-with-ocr-2.html?lang=eng.

(Continued)

*Primary Examiner* — Stephen R Koziol
*Assistant Examiner* — Mia M Thomas
(74) *Attorney, Agent, or Firm* — HP Inc. Patent Department

(57) ABSTRACT

Example embodiments relate to document alteration based on native text analysis and optical character recognition (OCR). In example embodiments, a system analyzes native text obtained from a native document to identify a text entity in the native document. At this stage, the system may use a native application interface to convert the native document to a document image and perform OCR on the document image to identify a text location of the text entity. The system may then generate an alteration box (e.g., redaction box, highlight box) at the text location in the document image to alter a presentation of the text entity.

11 Claims, 4 Drawing Sheets

(56) References Cited

U.S. PATENT DOCUMENTS

| | | | |
|---|---|---|---|
| 2010/0246951 A1* | 9/2010 | Chen et al. | 382/167 |
| 2010/0278453 A1* | 11/2010 | King | 382/321 |
| 2011/0099195 A1* | 4/2011 | Patwardhan | G06F 17/3084 707/769 |
| 2011/0222768 A1* | 9/2011 | Galic et al. | 382/170 |
| 2012/0079374 A1* | 3/2012 | Gaddis | 715/269 |
| 2014/0023275 A1* | 1/2014 | Krishna Kumar et al. | 382/182 |
| 2014/0212040 A1* | 7/2014 | Walker | G06K 9/2081 382/182 |

OTHER PUBLICATIONS

Intellidact® Intelligent Redaction Software, Computing System Innovations, Inc., 2008, https://developer-content.emc.com/marketplace/collateral/data_sheets/CSI_Intellidact Redaction_spec.pdf.

* cited by examiner

DOCUMENT ALTERATION BASED ON NATIVE TEXT ANALYSIS AND OCR

BACKGROUND

Often it is desirable to modify a document in some way before reproducing it for distribution to others. For example, a user may wish to alter (e.g., redact, highlight, etc.) portions of text or images in a document before distributing it in order to maintain confidentiality. Typically, the user manually reviews the document and designates portions of the document for alteration prior to production.

BRIEF DESCRIPTION OF THE DRAWINGS

The following detailed description references the drawings, wherein.

DETAILED DESCRIPTION

Figure 1:
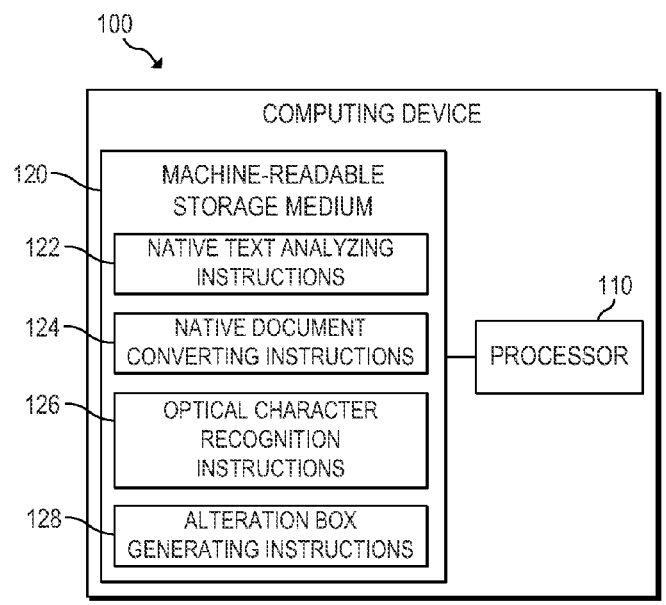
FIG. 1 is a block diagram of an example computing device for performing document alteration based on native text analysis and optical character recognition (OCR)

As discussed above, users often wish to alter (e.g., redact, highlight) portions of documents before producing the documents to other parties. For example, a user may wish to redact all occurrences of social security numbers from documents in order to protect the privacy of their respective holders. However, altering documents manually is a time consuming process that is susceptible to errors and oversights. To address this issue, the user may use an automated alteration process that is capable of recognizing portions of the documents for alteration.

Various document production applications exist that are capable of automatically redacting portions of a document. For example, a document production application may perform optical character recognition (OCR) on a scanned document to identify phone numbers for redaction. In this example, the document production application may identify candidates for redaction that are reviewed by a user. Alternatively, the document production application may automatically redact the identified phone numbers. In either case, the quality of the OCR may affect the recall of the identified portions for redaction. In this example, recall may be represented as the proportion of actual phone numbers that were identified by the document production application. For instance, if the scanned document includes five phone numbers and four of the phone numbers were identified, the recall of the analysis performed by the document production application would be 80%.

In another scenario, document production applications may analyze and convert native documents to document images that include alterations. For example, a document production application may analyze a formatted native document to identify social security numbers and then convert the formatted native document to a document image while simultaneously redacting the social security numbers. In this example, the document production application applies a third party application that simulates the formatting of the native document to generate the document image. As a result, the formatting in the document image may not accurately depict the native document as viewed in a corresponding native application.

Example embodiments disclosed herein provide document alteration based on native text analysis and OCR that is based on native text in a native document and OCR results of a document image rendered from the native document using a corresponding native application. For example, in some embodiments, a computing device analyzes native text from the native document to identify text entities (e.g., social security numbers, phone numbers, account numbers, etc.) of the native document that should be altered. At this stage, the native document may be converted to a document image using a native application interface, where the document image depicts the native document as it would be rendered by a native application associated with the native document. OCR may then be performed on the document image to recognize the characters and/or words in the document image and to determine the corresponding bounding rectangles for those characters and/or words. Based on the results of the OCR, locations of the text entities to be altered may be determined and altered in the document image.

In this manner, example embodiments disclosed herein improve the recall of automated alteration by analyzing native text of a native document and a native image conversion of the native document. Specifically, by performing a combined analysis of the native text and the document image, text entities in the document to be altered may be more consistently detected and represented. The use of the native image conversion creates more aesthetically pleasing images and allows for a more accurate visual representation of the document to be produced. Further, because the results of OCR performed on the document image can be enhanced with further analysis at a word-level, advanced matching algorithms (e.g., stemming) may be used to determine the text locations of the text entities in the document image.

Referring now to the drawings, FIG. 1 is a block diagram of an example computing device 100 for document alteration based on native text analysis and OCR. Computing device 100 may be, for example, a notebook computer, a desktop computer, an all-in-one system, a tablet computing device, a mobile phone, an electronic book reader, a printing device, or any other electronic device suitable for processing native documents for production. In the embodiment of FIG. 1, computing device 100 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable document alteration based on native text analysis and OCR. As an alternative or in addition to retrieving and executing instructions, processor 110 may include one or more electronic circuits comprising a number of electronic components for performing the functionality of one or more of instructions 122, 124, 126, 128.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for document alteration based on native text analysis and OCR.

Native text analyzing instructions 122 may obtain native text from a native document. For example, native text may be extracted from a word processing document, a spreadsheet, a presentation, etc. After receiving the native text, the text analyzing instructions 122 may then analyze the native text to identify text entities (i.e., portions of the native text) to be altered (e.g., redacted, highlighted) in the native document. Each of the text entities may be identified as matching a text pattern such as, but not limited to, a social security number, a bank account number, a phone number, a selected word or name, etc. The identified text entities may be stored and associated with the native document so that they may be accessed as discussed below by the alteration box generating instructions 128.

The native document may be any stored file that includes text. For example, the native document may be a word processing document, a spreadsheet, a presentation, a file-based database, a text file, etc. In this example, each of the native documents may be associated with a document type that may be represented by the extension of the file (e.g., a doc file extension indicates that the native document is a word processing file, a dbf file extension indicates that the native document is a database file, an xml file extension indicates that the native document is an extensible markup language file, etc.). A file extension may be used to determine a native application that is suitable for accessing and/or modifying a corresponding native document. For instance, a text editor can be identified as the appropriate native application for accessing a text file based on the txt file extension. In another example, a metadata field of the native document may be used to determine its document type. Specifically, a metadata field may be obtained from analysis of the header of the native document to identify the native application that should be used to access the native document.

In some cases, the text entities may be identified in the native text using recognition techniques such as named-entity recognition. Named-entity recognition may be applied to native text to identify and categorize text entities into predefined text categories (e.g., identification numbers, locations, organizations, individuals, dates, etc.). Once a text entity is identified and categorized, it may be determined whether the text entity should be altered. Particular text categories may be redacted regardless of their content (e.g., an identification number such as a social security number or driver's license number, phone numbers, etc.). In other cases, a text entity in a particular text category may be redacted if it satisfies search criteria. For example, a text entity categorized as an individual may be redacted if it matches a name included in a list of predetermined names that should be redacted. Alternatively, the text entities in the particular text category may be designated for redaction using pattern matching (e.g., regular expressions, wildcards, literal character strings, etc.). Particularly text categories may be similarly designated for highlighting as discussed above.

Native document converting instructions 124 may convert a native document to a document image. Specifically, native document converting instructions 124 may provide the native document to a native application interface and receive the document image as output. The native application interface is capable of rendering the native document in its native form as a document image (i.e., the document image presents the native document as it would be presented if viewed in the corresponding native application). Native document converting instructions 124 may also determine which native application interface to use based on the document type of the native document. In this case, native document converting instructions 124 may have access to numerous native application interfaces for a variety of document types.

Optical character recognition instructions 126 may perform OCR on the document image generated by the native document converting instructions 124. Specifically, OCR recognizes the characters in the document image as text and generates a bounding rectangle for each of the characters. A bounding rectangle is described by bounding coordinates on vertical and horizontal axes that form a geometric rectangle surrounding a corresponding character or word in the document image. In some cases, the bounding rectangle also includes a buffer area that extends the area surrounding the character. In this case, the buffer area may be determined using a preconfigured surrounding threshold that defines the additional area (i.e., additional height and width) that should be included in the bounding rectangle. Further, the preconfigured surrounding threshold may be a random value within a range of potential values so that the buffer area is a different height and width for each bounding rectangle. The buffer area may ensure that redaction boxes generated using the bounding rectangle better obfuscate the redacted character or word.

Optical character recognition instructions 126 may also perform further analysis to identify words based on the recognized characters. Specifically, optical character recognition instructions 126 may use the location of space characters to identify words in the document image. In this case, the average width of the space characters may be analyzed to locate superfluous spaces in the recognized characters. For example, a space character with a width that is significantly less than the average width may be determined to be superfluous and be ignored when identifying words in the document image. Similar to as discussed above with respect to characters, bounding rectangles may also be generated for each of the words, where the bounding rectangles can include a buffer area to better obfuscate the words.

Alteration box generating instructions 128 may generate alteration boxes for text entities identified by the native text analyzing instructions 122. Initially, alteration box generating instructions 128 may use the characters and/or words recognized by the optical character recognition instructions 126 to determine the text locations of the text entities in the document image. For example, alteration box generating instructions 128 may search the characters and/or words for matches to the text entities. In this example, advanced matching techniques such as stemming may be used to identify closely matching words in the OCR results to the text entities. Each matching set of characters and/or words may be designated as a text location of a corresponding text entity. After the text locations are determined, alteration boxes (e.g., redaction boxes, highlight boxes) may be generated using the bounding rectangles of the matching characters and/or words. In response to generating the redaction boxes, alteration box generating instructions 128 may create an updated document image that includes the redactions or highlights. In some cases, the updated document image may include both redactions and highlights. In this case, particular text categories may be designated for redaction while others are designated for highlighting.

Figure 2:
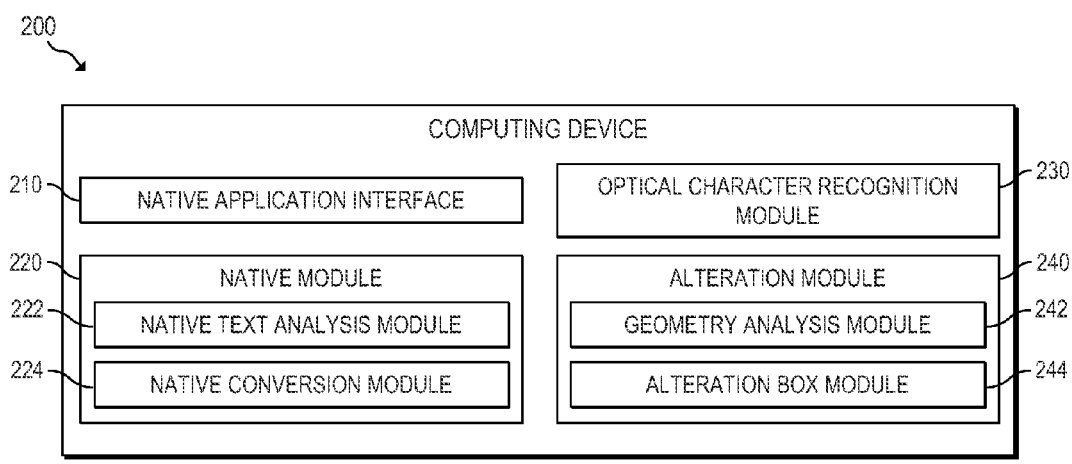
FIG. 2 is a block diagram of an example computing device including modules for performing aspects of document alteration based on native text analysis and OCR.

FIG. 2 is a block diagram of an example computing device 200 including modules for performing aspects of document alteration based on native text analysis and OCR. As with computing device 100 of FIG. 1, computing device 200 may be any electronic device suitable for processing native documents for production.

Native application interface 210 may be an application programming interface (API) that provides access to native functions of a native application. For example, native application interface 210 may be loaded as a dynamic linked library (DLL), shared library, or statically linked library that is accessible to other modules (e.g., native module 220) of computing device 200. Native functions provided by the native application interface 210 may include a print function that receives a native document as input and prints the native document to a selected format (e.g., hard copy, portable document format, image, etc.) with its native formatting. In the case of the image format, the native print function creates more aesthetically pleasing images and allows for more accurate visual representations in the document images to be generated from the native documents.

As illustrated in FIG. 2 and described in detail below, computing device 200 may also include a number of modules 220-244. Each of the modules may include a series of instructions encoded on a machine-readable storage medium and executable by a processor of computing device 200. In addition or as an alternative, each module 220-244 may include one or more hardware devices comprising electronic circuitry for implementing the functionality described below.

Native module 220 may access and analyze native documents for the purpose of identifying text entities to be altered (e.g., redacted, highlighted) in the native documents. Native text may refer to the content of the native document without formatting information. Native text analysis module 222 may obtain and analyze native text from a native document. For example, native text analysis module 222 may extract the native text directly from the native document if the native document is a markup language file (e.g., extensible markup language file, hypertext markup language file, etc.). In another example, if the native document is a binary file, the native text analysis module 222 may use the native application interface 210 to obtain the native text from the native document. Alternatively, the native text analysis module 222 may be configured to access particularly binary file formats directly in order to obtain the native text from the native document.

After obtaining the native text, native text analysis module 222 may analyze the native text to identify text entities for alteration. As discussed above with respect to FIG. 1, the text entities may be identified by using recognition techniques such as named-entity recognition or by using pattern matching that is facilitated by regular expressions, wildcards, etc. The identified text entities may be stored for later use by or provided directly to the alteration module 240 for further processing.

Native conversion module 224 may convert native documents to document images for further processing by the optical character recognition module 230. Specifically, native conversion module 224 may use native application interface 210 as discussed above to convert native documents to document images. After converting a native document to a document image, native conversion module 224 may associate the document image with the text entities identified for the native document by the native text analysis module 222.

Optical character recognition module 230 may perform OCR on the document images generated by native conversion module 224. For example, optical character recognition module 230 may perform OCR as discussed above with respect to optical character recognition instructions 126 of FIG. 1. The results (e.g., characters, words, bounding rectangles, etc.) of the OCR may be stored for later use by or provided directly to the alteration module 240 for further processing. In some cases, the optical character recognition module 230 may not have the capability to recognize words in the document image. In this case, the geometry analysis module 242 may use the characters and bounding rectangles in the OCR results to identify words and to generate corresponding bounding rectangles.

Alteration module 240 may generate alteration boxes (e.g., redaction boxes, highlight boxes) for native documents based on text entities identified by the native module 220 and OCR results provided by the optical character recognition module 230. Geometry analysis module 242 may search the OCR results of a document image to determine text locations of text entities identified in the native document as discussed above with respect to alteration box generating instructions 128 of FIG. 1. Specifically, geometry analysis module 242 may search for characters and/or words in the OCR results that match the text entities from the native document and then determine the text locations based on the corresponding bounding rectangles of any matching characters and/or words. For example, geometry analysis module 242 may search the OCR results of a document image for a social security number identified in a corresponding native document. If characters matching the social security number are found, geometry analysis module 242 may determine the text location of the social security number as the combination of the bounding rectangles of the matching characters. Alternatively, the optical character recognition module 230 may be configured to perform searches for characters and/or words in the OCR results.

Alteration box module 244 may generate alteration boxes (e.g., redaction boxes, highlight boxes) based on the text locations determined by the geometry analysis module 242. In response to generating the alteration boxes, alteration box module 244 may create an updated document image that includes the alteration boxes. Alternatively, the alteration box module 244 may store the alteration boxes for later use.

Figure 3:
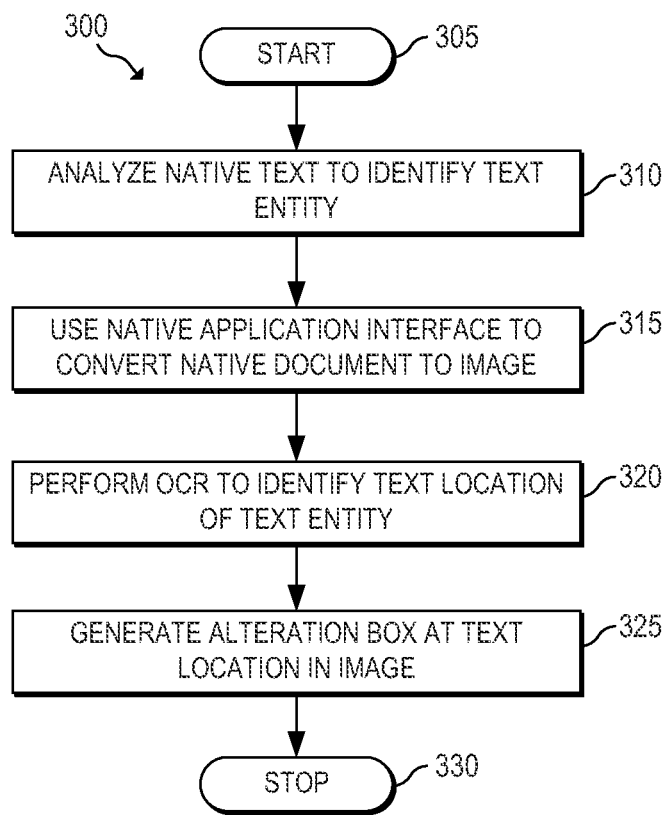
FIG. 3 is a flowchart of an example method for execution by a computing device for providing document alteration based on native text analysis and OCR.

FIG. 3 is a flowchart of an example method 300 for execution by a computing device 100 for document alteration based on native text analysis and OCR. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 may analyze native text from a native document to identify a text entity. Specifically, named-entity recognition may be performed to categorize the text entity, where the text entity is then optionally analyzed to determine if it should be altered. For example, a text entity categorized as being an identification number may be redacted regardless of its actual content (i.e., no further analysis is required). In another example, a text entity categorized as being a location may be highlighted if it matches an address included in a list of predetermined confidential addresses.

Next, in block 315, computing device 100 may use a native application interface to convert the native document to a document image. For example, computing device 100 may use a native application interface to convert the native document to a document image. The native application interface may convert the native document such that the document image is formatted the same as the native document when viewed in a corresponding native application.

In block 320, computing device 100 may perform OCR on the document image to identify the text location of the text entity. Initially, computing device 100 may recognize the characters in the document image and generate a bounding rectangle for each of the characters. Further, computing device 100 may recognize words in the document image based on the recognized characters. In this case, the words may be recognized by grouping characters occurring between space characters into words. In other cases, languages that do not use the English alphabet (e.g., Chinese) may include implicit splits between words other than space characters that could be used to recognize the words. For instance, a Chinese language document may be analyzed using a lexicon to perform context-specific word segmentation that identifies the implicit splits. After the OCR is performed, the characters and/or words may be searched to identify a portion of the document image that matches the text entity identified in block 310. At this stage, the bounding rectangles of the characters and/or words in the matching portion of the document image may be combined to generate the text location of the text entity.

In block 325, an alteration box (e.g., redaction box, highlight box) is generated based on the text location determined in block 320. The text location may be described as a bounding rectangle, which is used to generate an alteration box to alter (e.g., conceal, highlight) the text entity in the document image. In the case of redaction, the text location may already include a buffer to cover additional area surrounding the text entity, where the additional area further obfuscates the underlying text entity. Alternatively, a buffer may be added to the text location when generating the redaction box. In response to generating the alteration box, the document image may be modified to include the alteration box to conceal the text entity. Method 300 may subsequently proceed to block 330, where method 300 may stop.

Figure 4:
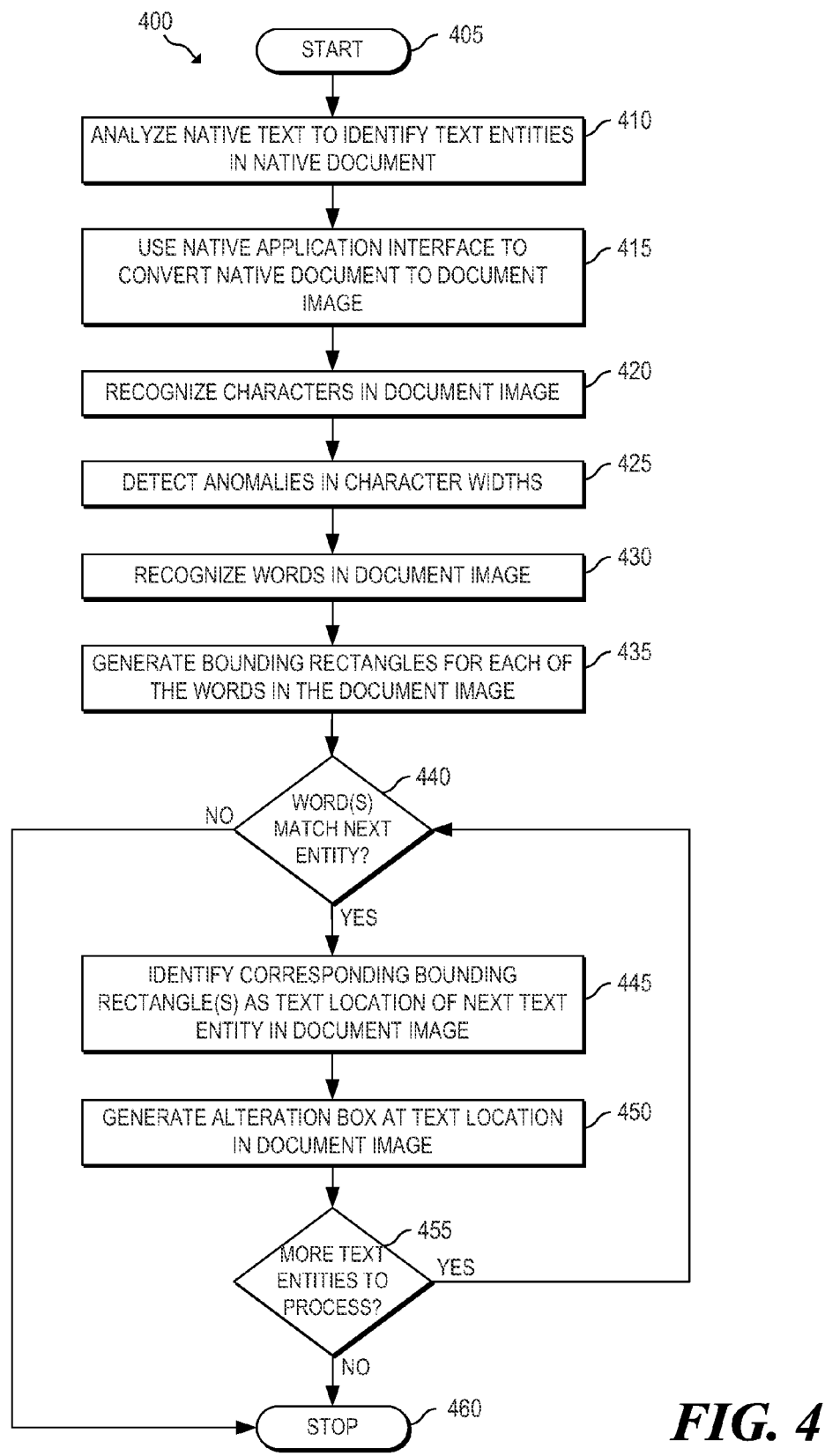
FIG. 4 is a flowchart of an example method for execution by a computing device for providing iterative document alteration based on native text analysis and OCR with anomaly detection.

FIG. 4 is a flowchart of an example method 400 for execution by a computing device 200 for providing iterative document alteration based on native text analysis and OCR with anomaly detection. Although execution of method 400 is described below with reference to computing device 200 of FIG. 2, other suitable devices for execution of method 400 may be used, such as computing device 100 of FIG. 1. Method 400 may be implemented in the form of executable instructions stored on a machine-readable storage medium and/or in the form of electronic circuitry.

Method 400 may start in block 405 and proceed to block 410, where computing device 200 may analyze native text to identify text entities in a native document. The native text may be obtained from the native document using a native application interface. Once the native text is obtained, named-entity recognition may be performed on the native text as discussed above to identify the text entities.

Next, in block 415, computing device 200 may use the native application interface to convert the native document to a document image. Specifically, the computing device 200 may call a print or similar function in the native application interface to generate the document image, where the document image is formatted as if the native document is being viewed in a corresponding native application.

In block 420, computing device 200 recognizes characters in the document image. For example, computing device 200 may perform OCR on the document image to recognize the characters and to generate a bounding rectangle for each of the characters. In block 425, anomalies are detected in the character widths of the characters recognized in block 420.

For example, the widths of the space characters may be analyzed to identify extraneous spaces with widths that differ greatly from the average width of a space character. In this example, the extraneous spaces may be removed from the OCR results obtained in block 420.

In block 430, computing device 200 may recognize words in the document images. Specifically, computing device 200 may group characters occurring between space characters into words. Computing device 200 may also identify words and word boundaries using a lexicon to perform context-specific word segmentation. Further, in block 435, bounding rectangles may be generated for the words by combining the bounding rectangles of the grouped characters.

At this stage, the text entities identified in block 410 may be sequentially analyzed. In block 440, it may be determined if there are any recognized words in the document image that match the next text entity in the list of text entities. Specifically, pattern matching analysis may be performed to search for any recognized words that match the next text entity, where advanced pattern matching techniques such as stemming may be applied to also match variations of the next text entity. For example, a stemming match technique may match variations of a root portion of the text entity to a matching word recognized in block 430 (e.g., "read" is a root portion of the word "reading," where "read" may be matched to "read," "reading," "reads," etc.). If there is no match for the next text entity, method 400 may proceed to block 460, where method 400 may stop.

If there is a match for the next text entity, method 400 may proceed to block 445, where bounding rectangle(s) are identified as the text location of the next text entity in the document image. For example, the bounding rectangle(s) of the characters and/or words matched in block 440 may be identified as the text location of the next text entity. In block 450, an alteration box (e.g., redaction box, highlight box) may be generated at the text location in the document image. Specifically, the bounding rectangle(s) identified in block 445 may be combined to generate the alteration box. In the case of redaction, a buffer area may be added to the redaction box to further obfuscate the underlying text entity by concealing the actual width and/or height of the text entity.

In block 455, it may be determined if there are more text entities to process from the list of text entities identified in block 410. If there are no more text entities to process, method 400 proceeds to block 460, where method 400 may stop. If there are more text entities to process, method 400 proceeds to block 440, where method 400 may proceed as discussed above with respect to blocks 440-455.

Figure 5:
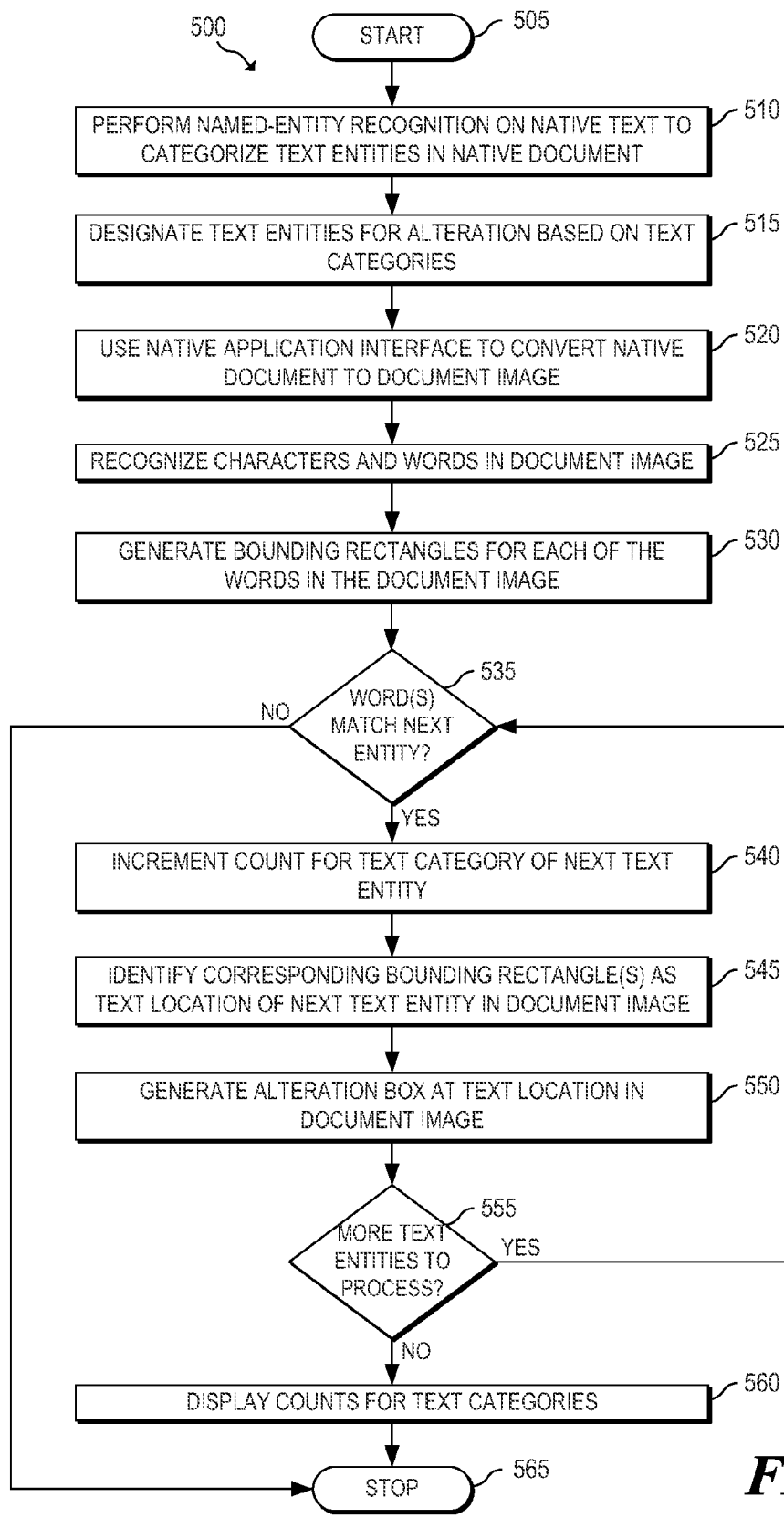
FIG. 5 is a flowchart of an example method for execution by a computing device for providing iterative document alteration based on native text analysis and OCR, where the iterative document alteration includes counting and displaying recall statistics.

FIG. 5 is a flowchart of an example method 500 for execution by a computing device 200 for providing iterative document alteration based on native text analysis and OCR, where the iterative document alteration includes counting and displaying recall statistics. Although execution of method 500 is described below with reference to computing device 200 of FIG. 2, other suitable devices for execution of method 500 may be used, such as computing device 100 of FIG. 1. Method 500 may be implemented in the form of executable instructions stored on a machine-readable storage medium and/or in the form of electronic circuitry.

Method 500 may start in block 505 and proceed to block 510, where computing device 200 may perform named-entity recognition on native text to categorize text entities in a native document. The native text may be obtained from the native document using a native application interface. Once the native text is obtained, named-entity recognition may be performed on the native text to categorize detected text entities into predefined text categories (e.g., identification numbers, locations, organizations, individuals, dates, etc.). In block 515, once the text entities are identified and categorized, it may be determined whether each of the text entities should be altered (e.g., redacted, highlighted) based on its predefined text category. In some cases, particular text categories may be redacted regardless of their content (e.g., an identification numbers such as a social security number or driver's license number, phone numbers, etc. may be redacted regardless of content). In other cases, a text entity in a particular text category may be redacted if it satisfies a pattern match. Particularly text categories may be similarly designated for highlighting as discussed above.

Next, in block 520, computing device 200 may use the native application interface to convert the native document to a document image. Specifically, the computing device 200 may call a print or similar function in the native application interface to generate the document image, where the document image is formatted as if the native document is being viewed in a corresponding native application.

In block 525, computing device 200 recognizes characters and words in the document image. For example, computing device 200 may perform OCR on the document image to recognize the characters and to generate a bounding rectangle for each of the characters. Further, computing device 200 may also recognize words in the document images by grouping recognized characters occurring between space characters into words. In other cases, languages that do not use the English alphabet (e.g., Chinese) may include implicit splits between words other than space characters that could be used to recognize the words. In block 530, bounding rectangles may be generated for the words by combining the bounding rectangles of the grouped characters.

At this stage, the text entities identified in block 510 may be sequentially analyzed. In block 535, it may be determined if there are any recognized words in the document image that match the next text entity in the list of text entities. Specifically, pattern matching analysis may be performed to search for any recognized words that match the next text entity, where advanced pattern matching techniques such as stemming may be applied to also match variations of the text entity. If there is no match for the next text entity, method 500 may proceed to block 565, where method 500 may stop.

If there is a match for the next text entity, method 500 may proceed to block 540, where a count (i.e., quantity) is incremented for the predefined text category of the next text entity. For example, if the next text entity is an identification number, the count of matched identification numbers may be incremented. In block 545, bounding rectangle(s) are identified as the text location of the next text entity in the document image. For example, the bounding rectangle(s) of the characters and/or words matched in block 535 may be identified as the text location of the next text entity. In block 550, an alteration box (e.g., redaction box, highlight box) may be generated at the text location in the document image. Specifically, the bounding rectangle(s) identified in block 545 may be combined to generate the alteration box. In the case of redaction, a buffer area may be added to the redaction box to further obfuscate the underlying text entity by concealing the actual width and/or height of the text entity.

In block 555, it may be determined if there are more text entities to process from the list of text entities identified in block 510. If there are more text entities to process, method 500 proceeds to block 540, where method 500 may proceed as discussed above with respect to block 540-455. If there are no more text entities to process, method 500 proceeds to block 560, where the count of text entities with matches in the OCR results for each of the predetermined text categories is displayed. For example, computing device 200 may display a notification that ten identification numbers of the twelve identifications numbers and that eight addresses of the nine addresses identified in block 510 were matched and altered. The count of matches may be related to the recall achieved by the iterative document alteration of method 500, where recall is the proportion of actual text entities that are altered in the document. Method 500 may then proceed to 565, where method 500 may stop.

The foregoing disclosure describes a number of example embodiments for document alteration based on native text analysis and OCR by a computing device. In this manner, the embodiments disclosed herein enable document alteration based on native text analysis and OCR by analyzing native text of a native document and OCR results of a document image converted from the native document.

We claim:

1. A system for document alteration based on native text analysis and optical character recognition (OCR), the system comprising:
   at least one processor to:
      analyze native text obtained from a native document to identify a text entity in the native document;
      use a native application interface to convert the native document to a document image, wherein the native application interface is determined based on a document type of the native document;
      perform OCR on the document image to identify a text location of the text entity, wherein the identifying of the text location of the text entity comprises:
         recognizing a plurality of words in the document image,
         matching a given word of the plurality of words recognized in the document image with the text entity identified by the analyzing of the native text obtained from the native document, wherein the matching comprises matching variations of a root portion of the text entity to the given word of the plurality of words,
         generating a plurality of bounding coordinates for each of the plurality of words, wherein the plurality of bounding coordinates describe a bounding rectangle of a plurality of bounding rectangles that surrounds the given word of the plurality of words, and
         using the boundary rectangle that surrounds the given word to identify the text location of the text entity; and
      generate a redaction box at the text location in the document image to conceal the text entity.

2. The system of claim 1, wherein the redaction box is generated using a surrounding threshold so that the redaction box further conceals a buffer area surrounding the text entity.

3. The system of claim 1, wherein the analyzing of the native text to identify the text entity comprises performing named-entity recognition to categorize the text entity in a predetermined text category, wherein the text entity is designated for redaction based on the predetermined text category.

4. The system of claim 1, wherein the processor is to select the used native application interface from a plurality of native application interfaces corresponding to respective different document types, the selecting of the used native application interface is based on the document type of the native document.

5. A method for document alteration based on native text analysis and optical character recognition (OCR) on a computing device, the method comprising:

performing, by the computing device, named-entity recognition on native text from a native document to categorize a text entity of the native text in a predefined text category, wherein the text entity is designated for redaction based on the predefined text category;

using a native application interface to convert the native document to a document image, wherein the native application interface is determined based on a document type of the native document;

performing OCR on the document image to identify a text location of the text entity, wherein performing the OCR on the document image to identify the text location of the text entity comprises:

recognizing a plurality of words in the document image;

generating a plurality of bounding coordinates for each of the plurality of words, wherein the plurality of bounding coordinates describe a bounding rectangle of a plurality of bounding rectangles that surrounds one of the plurality of words;

using the plurality of words and the plurality of bounding rectangles to identify the text location of the text entity, wherein using the plurality of words and the plurality of bounding rectangles to identify the text location of the text entity comprises matching variations of a root portion of the text entity to a matching word of the plurality of words, wherein the matching word is associated with the text location; and generating a redaction box at the text location in the document image to conceal the text entity.

6. The method of claim 5, wherein the redaction box is generated using a surrounding threshold so that the redaction box further conceals a buffer area surrounding the text entity.

7. The method of claim 5, further comprising selecting, by the computing device, the used native application interface from a plurality of native application interfaces corresponding to respective different document types, the selecting of the used native application interface is based on the document type of the native document.

8. A non-transitory machine-readable storage medium encoded with instructions executable by at least one processor to:

perform named-entity recognition on native text from a native document to categorize each of a plurality of text entities in a respective text category of a plurality of predefined text categories;

use a native application interface to convert the native document to a document image, wherein the native application interface is determined based on a document type of the native document;

perform OCR on the document image to identify a plurality of text locations for the plurality of text entities, wherein the identifying of a first text location of a first text entity of the plurality of text entities comprises matching a given word of a plurality of words recognized by the OCR on the document image with the first text entity identified by the named-entity recognition on the native text from the native document, and using a location of the given word recognized by the OCR as the first text location;

generate redaction boxes at the plurality of text locations in the document image to conceal the plurality of text entities;

calculate a quantity of text entities of the plurality of text entities that are categorized in a first text category of the plurality of predefined text categories; and cause display of the quantity of text entities that are categorized in the first text category.

9. The machine-readable storage medium of claim 8, wherein the instructions are executable by the processor to further select the used native application interface from a plurality of native application interfaces corresponding to respective different document types, the selecting of the used native application interface is based on the document type of the native document.

10. A non-transitory machine-readable storage medium encoded with instructions executable by at least one processor to:

perform named-entity recognition on native text from a native document to categorize each of a plurality of text entities in a respective text category of a plurality of predefined text categories;

use a native application interface to convert the native document to a document image, wherein the native application interface is determined based on a document type of the native document;

perform OCR on the document image to identify a plurality of text locations for the plurality of text entities, wherein the identifying of a first text location of a first text entity of the plurality of text entities comprises:

recognizing a plurality of words in the document image, matching a given word of the plurality of words recognized by the OCR in the document image with the first text entity identified by the named-entity recognition on the native text from the native document, generating a plurality of bounding coordinates for each of the plurality of words, wherein the plurality of bounding coordinates describe a bounding rectangle of a plurality of bounding rectangles that surrounds the given word of the plurality of words, and using the boundary rectangle that surrounds the given word to identify the first text location of the first text entity; and generate redaction boxes at the plurality of text locations in the document image to conceal the plurality of text entities.

11. The machine-readable storage medium of claim 10, wherein the matching comprises matching variations of a root portion of the first text entity to the given word of the plurality of words.

* * * * *